A. B. BEITMAN.
CLEANING DEVICE.
APPLICATION FILED AUG. 27, 1917.
1,368,982. Patented Feb. 15, 1921.
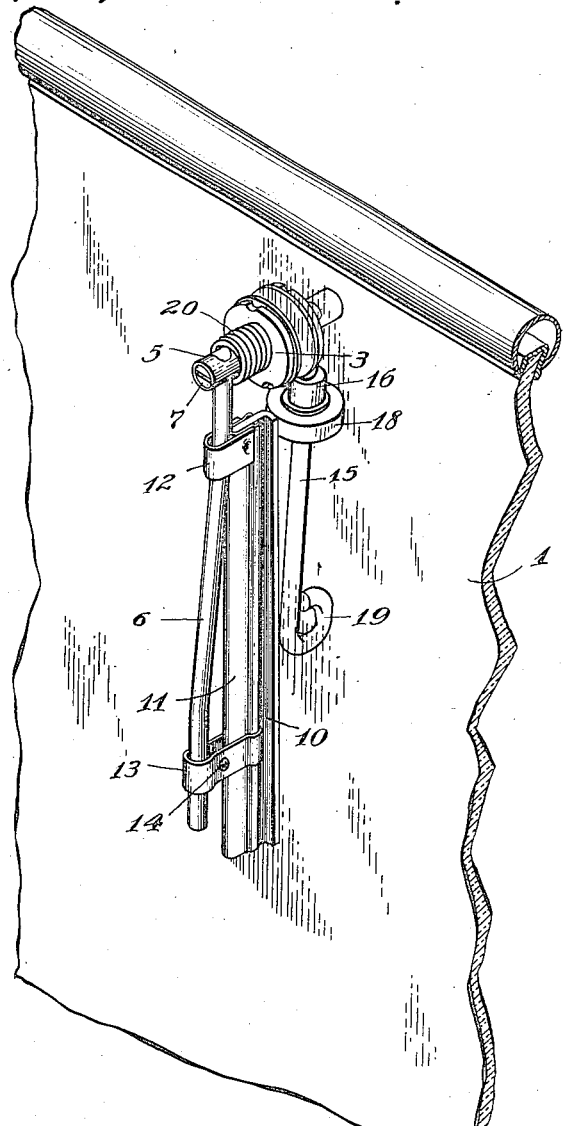
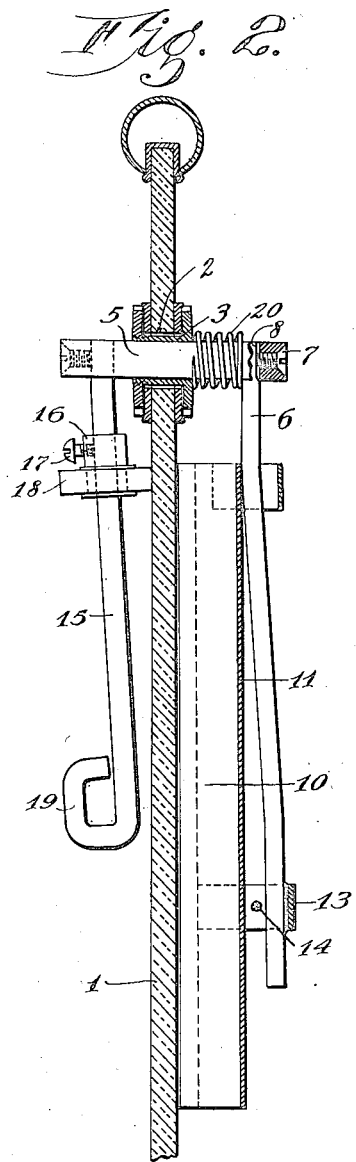
Inventor,
Albert B. Beitman.
By Hull, Smith, Brock & West
Attys.

UNITED STATES PATENT OFFICE.

ALBERT B. BEITMAN, OF EAST CLEVELAND, OHIO, ASSIGNOR TO THE OUTLOOK COMPANY, OF CLEVELAND, OHIO, A CORPORATION OF OHIO.

CLEANING DEVICE.

1,368,982.　　　　Specification of Letters Patent.　　Patented Feb. 15, 1921.

Application filed August 27, 1917. Serial No. 188,301.

*To all whom it may concern:*

Be it known that I, ALBERT B. BEITMAN, a citizen of the United States, residing at East Cleveland, in the county of Cuyahoga and State of Ohio, have invented a certain new and useful Improvement in Cleaning Devices, of which the following is a full, clear, and exact description, reference being had to the accompanying drawings.

This invention relates to improvements in devices for cleaning windshields, the term being used in its broadest sense and meaning the windshields of automobiles, windows of car motormen's vestibules, look-out windows of locomotive cabs, etc.

It relates more particularly to the type of windshield cleaners having their operating shafts supported in bearings that occupy apertures in the windshield panes. Its utility, however, is not confined to this particular type as will be readily perceived from the description which follows. It is peculiarly adapted to the particular type mentioned because its primary function is to relieve the pane of undue strain during the operation of the device and thus protect the pane against breakage which is more liable to occur in panes weakened by the apertures through which the operating shafts project.

It is the fundamental object of this invention to yieldingly retain the shaft in its normal longitudinal position by means wholly independent of the wiper strip and adjustable to vary the longitudinal position of the shaft, thereby to alter the pressure of the wiper strip upon the pane, such pressure remaining substantially constant after the adjustment is made. Such an arrangement assures ease of operation, uniform bearing of the strip from end to end, and the holding of the parts against undue freedom of movement, thus obviating rattling or the possibility of the device being swung from inoperative or normal position by the vibration of the vehicle. Further objects are to provide means, convenient of operation, for adjusting the shaft longitudinally to vary the pressure of the wiper strip upon the pane; and the provision of an economical and simple construction wherein the foregoing objects are attained.

In the accompanying drawing, Figure 1 is a perspective view of a cleaner embodying my invention and applied to an automobile windshield; and Fig. 2 is a section through the windshield on the center-line of the device.

1 is the pane of a windshield having an aperture 2 within which is clamped a tubular bearing element 3. A shaft 5 is rotatably supported by the bearing element and is capable of longitudinal movement therein. An arm 6 is attached to the end of the shaft 5 on the outer side of the pane, as by having its upper end inserted through a transverse opening in the shaft and locked against withdrawal by a set screw 7, screwed into the end of the shaft and having its inner end bearing upon a flattened portion 8 of the arm.

A portion of the wiper strip 10 is clamped within a sheet metal sheath 11 which has a loop 12 secured to its upper end that embraces the arm 6. A clamp 13 is preferably fixedly applied to the lower end portion of the arm 6 and its opposed jaws are held firmly against separation and against the opposite sides of the sheath 11, by connecting means 14, which may be a rivet or its equivalent. This arrangement permits the wiper strip to be easily adjusted longitudinally of the arm.

An operating handle 15 is connected to the end of the shaft 5 on the inner side of the pane in like manner to the attachment of the arm 6 to the shaft. The handle 15 is angularly disposed with respect to the pane, and carries a sleeve 16 adjustable lengthwise of it and capable of being locked in any desired position by a set screw 17. A roller 18, preferably of rubber, is rotatably carried by the sleeve and bears against the adjacent surface of the pane. The lower end of the handle is shown as provided with a grip portion 19 by which it may be conveniently grasped by the user.

A cushion element 20 shown as consisting of a compression spring, is interposed between the outer end of the bearing element 3 and the arm 6 and tends to retain the shaft in its outermost position, the roller 18 limiting the outward movement of the shaft, as will be readily understood. It will be seen, therefore, that this cushion element or spring, and the pliable roller 18, serves to maintain the shaft 5 yieldingly in normal longitudinal position, and that the parts are sustained against undue freedom of movement entirely independent of the wiper strip 10. It is obvious, also, that the wiper strip may be caused to bear upon the pane with any desired degree of pressure by adjusting the roller 18 along the inclined operating handle 15. It is desirable to have the wiper strip bear upon the pane with sufficient pressure to remove any substance deposited there, but without undue pressure, for such would interfere with the ease of operation and would subject the wiper strip to unnecessary wear.

As will be observed in Fig. 1, the pliable nature of the wiper strip causes its pane engaging edge to lie over to one side, the extreme edge following the body portion of the strip as it moves across the pane. Consequently, as the direction of movement of the strip is reversed, its edge portion will turn or flip over so as to follow, as before, and during this flipping over of the edge portion, the parts are permitted to yield by reason of the inherent resiliency of the roller 18, arm 6, and handle 15, to compensate for the momentary separation between the arm 6 and the pane, due to the effective increase in the width of the strip as its edge portion passes from one side to the other.

Having thus described my invention what I claim is:—

1. A device for cleaning a pane, said device comprising a shaft, means supporting the shaft transversely of the plane of the pane and wherein the shaft is capable of rotative and longitudinal movement, means for oscillating the shaft, means limiting the outward movement of the shaft, yielding means tending to maintain the shaft in its extreme outward position, and a wiper supported by the outer end of the shaft in continuous cleaning contact with the pane.

2. A device for cleaning a pane, said device comprising a shaft, means supporting the shaft transversely of the plane of the pane and wherein the shaft is capable of rotative and longitudinal movement, means for oscillating the shaft, means limiting the outward movement of the shaft and adjustable to vary the longitudinal position of the shaft, yielding means tending to maintain the shaft in its extreme outward position, and a wiper supported by the outer end of the shaft in continuous cleaning contact with the pane.

In testimony whereof, I hereunto affix my signature.

ALBERT B. BEITMAN.